United States Patent [19]

Yasui et al.

[11] Patent Number: 4,472,869
[45] Date of Patent: Sep. 25, 1984

[54] METHOD OF ASSEMBLING TRANSMISSION GEARS

[75] Inventors: Yasuyoshi Yasui; Masaki Inui, both of Toyota, Japan

[73] Assignee: Toyota Jidosha Kabushiki Kaisha, Toyota, Japan

[21] Appl. No.: 403,044

[22] Filed: Jul. 29, 1982

[30] Foreign Application Priority Data

Sep. 9, 1981 [JP] Japan .................................. 56-142122

[51] Int. Cl.$^3$ .............................................. B23P 11/00
[52] U.S. Cl. ....................................... 29/434; 29/252; 29/264; 29/525; 74/359
[58] Field of Search .............. 29/525, 252, 264, 256, 29/434, 244; 74/359, 606 R

[56] References Cited

U.S. PATENT DOCUMENTS

| | | | |
|---|---|---|---|
| 1,157,666 | 10/1915 | Bennett | 29/525 |
| 1,779,805 | 10/1930 | Dunwoodie | 29/525 UX |
| 2,488,476 | 11/1949 | Péne | 29/252 |
| 2,633,753 | 4/1953 | Campodonico | 74/359 X |
| 2,721,377 | 10/1955 | Hedlund | 29/264 |
| 3,033,597 | 5/1962 | Miller | 29/252 X |
| 3,102,432 | 9/1963 | Gerst | 74/606 X |
| 3,104,459 | 9/1963 | Wendt | 29/252 |
| 3,110,957 | 11/1963 | Culbertson | 29/264 X |
| 4,106,358 | 8/1978 | Morrison | 74/359 X |
| 4,136,574 | 1/1979 | Morrison | 74/359 |

Primary Examiner—Charlie T. Moon
Attorney, Agent, or Firm—Cushman, Darby & Cushman

[57] ABSTRACT

The application discloses a method of assembling gears, transmission shafts, fork shift shaft and associated component parts of a 5-speed transmission for a vehicle. The fifth-speed gear and the hub therefor are designed to be installed outside the end of the transmission case which is remote from the end thereof secured to a clutch housing. After first to fourth-speed gears and associated component parts are mounted on the transmission shafts which have already been mounted at their one ends to bearings mounted on the clutch housing, the transmission case is moved over the transmission shafts, the gears and the associated component parts thereof in such a manner that an open end of the transmission case is directed toward the clutch housing until the open end of the transmission case reaches the clutch housing and the other ends of the transmission shafts are inserted into and project through bearings mounted on the other end of the transmission case. After the transmission case is secured at its open end to the clutch housing, the fifth-speed gear and the associated hub are mounted on the projecting ends of the shafts. The fifth-speed gear and the projecting end portion of the associated transmission shaft are provided with internal and external splines for engagement with each other. A cylindrical first jig is threadably connected to the end extremity of the projecting end portion of the shaft. Thereafter, the fifth-speed gear is axially movably mounted on the first jig. An annular second jig is then positioned around the first jig and axially outwardly of the fifth-speed gear and forcibly urged by a mechanical or hydraulic device against the fifth-speed gear to press-fit the same onto the splined part of the projecting end portion of the output shaft while the first jig is caused to take up the reaction force generated during the press-fitting of the fifth-speed gear.

2 Claims, 2 Drawing Figures

METHOD OF ASSEMBLING TRANSMISSION GEARS

BACKGROUND OF THE INVENTION

The present invention relates to a method of assembling transmission gears for vehicles. More particularly, the invention is concerned with an improvement in a method of assembling transmission gears which includes the steps of:

mounting a first group of bearings for transmission shafts on an end wall of a clutch housing to be secured to a transmission case;

mounting on said transmission shafts gears and associated component parts which are adapted to be positioned within said transmission case;

mounting said transmission shafts at their one ends onto said first group of bearings;

said transmission case having a first open end to be secured to said end wall of said clutch housing and a second end formed therein with openings for receiving a second group of bearings for said transmission shafts;

mounting said second group of bearings in said openings in said second end of said transmission case;

moving said transmission case relative to said transmission shafts, said gears and associated component parts thereon in such a manner that said first open end on said transmission case is directed toward said clutch housing until said first end of said transmission case reaches said clutch housing and the other ends of said transmission shafts are inserted into and project outwardly through said second group of bearings;

rigidly securing said first end of said transmission case to said clutch housing;

mounting onto the outwardly projecting end portions of said transmission shafts gears to be positioned outside second end of said transmission case;

said projecting end portions of said transmission shafts and the last-mentioned gears being provided with external and internal splines for engagement with each other; and mounting a cover member onto said second end of said transmission case so that the last-mentioned gears are covered with said cover member.

DESCRIPTION OF THE PRIOR ART

The known method of assembling transmission gears involves the following problems: When each external gear to be installed outside the second end of the transmission case is press-fitted onto the projecting end portion of an associated transmission shaft by means of a press-fitting tool comprising a pressure applying jig and a load bearing jig, the reaction force generated as a result of the press-fitting of the gear at said end portion of the shaft is taken up at the opposite end of the shaft, i.e., at the end of the shaft adjacent to the clutch housing. For this reason, the end wall of the clutch housing adjacent to the transmission case must be formed therein with an opening solely for the purpose of allowing the load bearing jig to take up the reaction force. After the press-fitting of the gears, the opening for the load bearing jig has to be closed by a detachable closure. The opening formed in the clutch housing end wall undesirably lowers the rigidity and mechanical strength of the clutch housing and transmission case. In addition, the closure for the opening occupies a space wastefully. This not only adversely affects compact transmission design but also increases the cost of manufacture. Moreover, lubricant oil tends to leak through the junction between the opening in the clutch housing end wall and the closure. Further more, the known gear press-fitting method needs a bulky and complicated press-fitting tool because the pressure applying jig and the load bearing jig have to be positioned adjacent to the opposite ends of each transmission shaft at the time when the external gears are press-fitted onto the projecting ends thereof.

SUMMARY OF THE INVENTION

It is an object of the present invention to provide an improved method of assembling transmission gears which eliminates the problems discussed above.

In the known method of assembling transmission gears briefly discussed above, the improvement according to the present invention comprises:

prior to the step of mounting said cover member, removably connecting a substantially cylindrical first jig to a part of the projecting end portion of at least one of said transmission shafts, said part extending axially outwardly from the splined portion of said one transmission shaft, said first jig having an outer diameter smaller than the inner diameter of the splined inner peripheral surface of a gear to be mounted on said splined portion of said one transmission shaft; axially movably mounting the last-mentioned gear onto said first jig; placing a second jig around said first jig and axially outwardly of last-mentioned gear; forcibly moving said second jig axially inwardly against the last-mentioned gear to press-fit the same onto the splined portion of said one transmission shaft while causing said first jig to take up a reaction force; and removing said first and second jig from said one transmission shaft.

According to the present invention, therefore, the reaction force produced during a press-fitting of an external gear onto a transmission shaft is taken up at the shaft end the same as the shaft end to which the gear is press-fitted. This makes it unnecessary to form an opening in the end wall of the clutch housing adjacent to the transmission case. This offers the following advantageous results:

(A) Transmission design can be compact;
(B) Cost of manufacture can be lowered;
(C) Transmission case and clutch housing can be designed to provide improved rigidity and mechanical strength;
(D) Elimination of the opening in the clutch housing end wall for the load bearing jig results in elimination of problem of lubricant leakage; and
(E) Gear press-fitting tool can be of shortened length and simplified construction.

The above and other objects, features and advantages of the present invention will be made apparent by the following description with reference to the accompanying drawings.

DESCRIPTION OF PREFERRED EMBODIMENT

A preferred embodiment of the invention will be described hereinunder with reference to the accompanying drawings.

Figure 1:
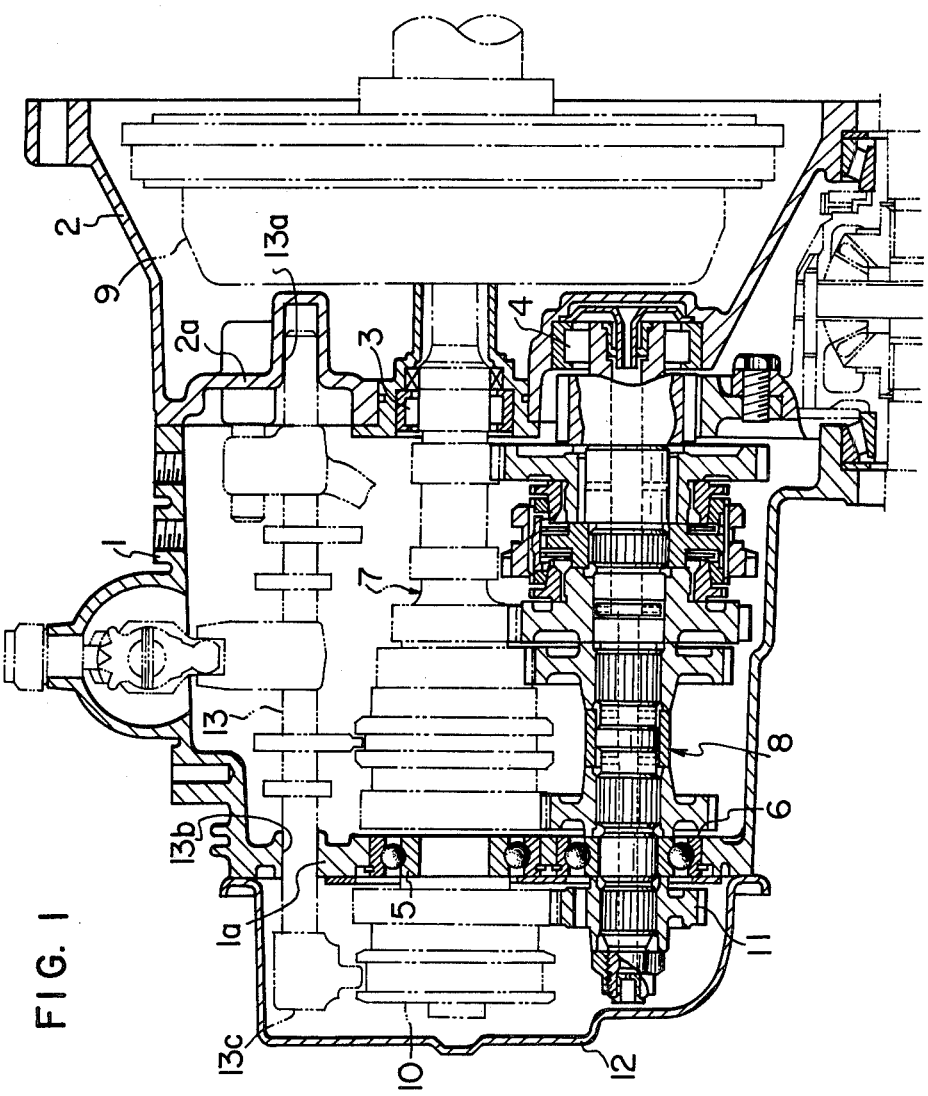
FIG. 1 is an axial sectional view of transmission gears assembled by the method of the invention.

Referring first to FIG. 1, a transmission case 1 is opened at its right end which is secured to a clutch housing 2. Bearings 3 and 4 of a first group are secured to an end wall 2a of the clutch housing 2 adjacent to the transmission case 1. The left end of the transmission case is closed by an end wall 1a to which are secured bearings 5 and 6 of a second group. An input shaft 7 and an output shaft 8 extend axially through the transmission case 1. These shafts 7 and 8 are rotatably supported at their opposite ends by the bearings 3 and 4 of the first group and the bearings 5 and 6 of the second group. In order to permit the shaft 7 to be connected at its right end to the clutch 9, an opening is formed in the portion of the end wall 2a of the clutch housing 2 axially opposing to the bearing 3. In contrast, no opening is formed in the portion of the end wall 2a axially opposing to the bearing 4 which supports the right end of the output shaft 8.

The left ends of the input shaft 7 and the output shaft 8 project to the outside of the transmission case 1 through bearings 5 and 6. A fifth-speed gear 11 and hub 10 for the fifth-speed gear 11 are mounted on the projecting ends of the output shaft 8 and the input shaft 7, respectively. First to fourth-speed gears and synchro-meshing devices associated with these gears are mounted in conventional manner on the portions of the transmission shafts 7 and 8 extending within the transmission case 1. An end cover 12 is secured to the left end of the transmission case in such a manner as to cover the fifth-speed gear 11 and the hub 10. A reference numeral 13 denotes a fork shift shaft.

The transmission gears are assembled in the same process as the known method except the mounting of the fifth-speed gear 11 and the hub 10. Namely, the bearings 3 and 4 of the first group are first secured to the end wall 2a of the clutch housing 2 adjacent to the transmission case 1. Then, the gears to be mounted in the transmission case 1, i.e., the first to fourth-speed gears, and the associated synchro-meshing devices are mounted on the input shaft 7 and the output shaft 8. Meanwhile, forks and other related members are mounted on the fork shift shaft 13. The right ends of the transmission shafts 7 and 8 are inserted into the bearings 3 and 4 of the first group, while the right end of the fork shift shaft 13 is inserted into a shaft hole 13a formed in the end wall 2a of the clutch housing 2. Thereafter, the transmission case 1 is moved over the shafts 7, 8 and 13 from their left ends to the right ends until the left ends of the transmission shafts 7 and 8 are inserted into and extend through the bearings 5 and 6 of the second group secured to the left end wall of the transmission case and the left end of the fork shift shaft 13 is also inserted into and extends through a shaft hole 13b formed in the end wall 1a of the transmission case 1. The right or open end of the transmission case is then secured or bolted to the clutch housing 2.

After completing the steps mentioned above, the fifth-speed gear 11, hub 10 and the fork 13c are mounted on the input shaft 7, output shaft 8 and the fork shift 13c, respectively. In the illustrated embodiment of the invention, the fifth gear 11 is mounted on the output shaft 8 in a manner different from that in the conventional method. This difference will be explained hereinunder with specific reference to FIG. 2.

A spline 8a for engaging with the fifth-speed gear 11 is formed on the portion of the output shaft 8 just outside of the bearing 6. The portion of the output shaft 8 just outside of the spline 8a, i.e., the outer most portion of the output shaft 8, has an outer diameter smaller than that of the splined portion 8a. A screw thread 8b is formed on the outer peripheral surface of the outermost smaller-diameter portion of the shaft 8.

In mounting the fifth-speed gear 11, a first jig 100 having a substantially cylindrical form with an outer diameter smaller than the inner diameter of the spline 11a in the gear 11 is screwed over the screw thread 8b formed on the outermost end portion of the output shaft 8. Then, the fifth-speed gear 11 is loosely mounted on the first jig 100 as shown by broken lines in FIG. 2. Subsequently, a substantially annular second jig 200 is disposed around the first jig 100 and outwardly of the fifth gear 11, i.e., at the left side of the fifth-speed gear 1 as viewed in FIG. 2. This second jig 200 is connected to the first jig 100 through mechanical or hydraulic means 300 shown by broken lines. The first jig 100, the second jig 200 and the mechanical or hydraulic means 300 cooperate together to form a press-fitting device denoted generally by reference numeral 400.

Figure 2:
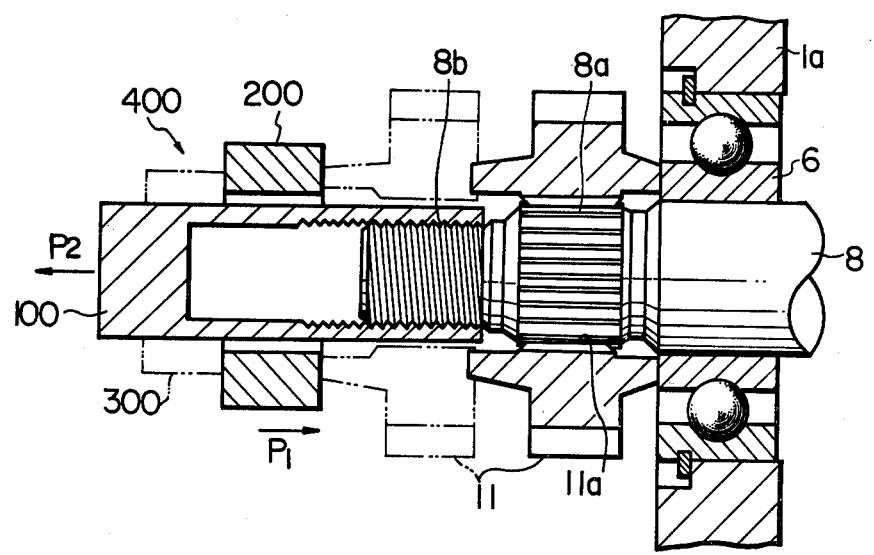
FIG. 2 is an enlarged sectional view of a fifth-speed gear fitted by pressure to the projecting end of an output shaft by the cooperation of a first jig and a second jig.

After the members have been set as explained, the device 400 is actuated to drive the second jig 200 to the right as viewed in FIG. 2 to urge the fifth-speed gear 11 on the first jig 100 with a force $P_1$ thereby to forcibly fit the fifth gear 11 onto the spline 8a of the output shaft 8. During the driving of the second jig 200, a force $P_2$ equal to but opposite to the force $P_1$ is exerted to the output shaft 8 through the first jig 100 screwed to the screw thread 8b on the outermose end portion of output shaft 8. Namely, the first jig 100 takes up the reaction force generated during press-fitting of the gear 11.

As will be understood from the foregoing description, according to the invention, the reaction force generated when the fifth-speed gear 11 is forcibly fitted onto the projecting end of the output shaft 8 is taken up not at the other end of the output shaft 8 but at the end of the output shaft 8 to which the gear 11 is press-fitted. It is, therefore, unnecessary to form a hole or an opening in the clutch housing end wall 2a for passing therethough a jig for taking up the reaction force $P_2$. It will therefore be appreciated that the method according to the present invention eliminates the above-discussed problems encountered in the case where such an opening is formed in the clutch housing end wall 2a.

In the described and illustrated embodiment of the invention, the outermost end of the output shaft 8 is formed thereon with the external screw thread 8b. The output shaft 8 may alternatively be formed therein with an internal screw thread (not shown). In this alternative case, the first jig 100 may also be modified to engage with the internal screw thread.

The method of the present invention is not limited to the mounting of the fifth-speed gear 11 and may also be applied to the mounting of the fifth-speed gear hub 10 onto the input shaft 7.

After the fifth-speed gear 11 has been fitted onto the output shaft 8, the cover 12 is attached to the left end of the transmission case 1 in the conventional manner.

What is claimed is:

1. In a method of assembling transmission gears for a vehicle including the steps of:

mounting a first group of bearings for transmission shafts on an end wall of a clutch housing to be secured to a transmission case;

mounting on said transmission shafts gears and associated component parts which are adapted to be positioned within said transmission case;

mounting said transmission shafts at their one ends onto said first group of bearings;

said transmission case having a first open end to be secured to said end wall of said clutch housing and a second end formed therein with openings for receiving a second group of bearings for said transmission shafts;

mounting said second group of bearings in said openings in said second end of said transmission case;

moving said transmission case relative to said transmission shafts, said gears and associated component parts thereon in such a manner that said first open end of said transmission case is directed toward said clutch housing until said first end of said transmission case reaches said clutch housing and the other ends of said transmission shafts are inserted into and project outwardly through said second group of bearings;

rigidly securing said first end of said transmission case to said clutch housing;

mounting onto the outwardly projecting end portions of said transmission shafts gears to be positioned outside said second end of said transmission case;

said projecting end portions of said transmission shafts and the last-mentioned gears being provided with external and internal splines for engagement with each other; and mounting a cover member onto said second end of said transmission case so that the last-mentioned gears are covered with said cover member;

the improvement which comprises:

prior to the step of mounting said cover member, removably connecting a substantially cylindrical first jig to a part of the projecting end portion of at least one of said transmission shafts, said part extending axially outwardly from the splined portion of said one transmission shaft, said first jig having an outer diameter smaller than the inner diameter of the splined inner peripheral surface of a gear to be mounted on said splined portion of said one transmission shaft; axially movably mounting the last-mentioned gear onto said first jig; placing a second jig around said first jig and axially outwardly of the last-mentioned gear, moving said second jig against said last-mentioned gear to press-fit the same onto the splined portion of said one transmission shaft while applying a tensile force to said first jig to take up a reaction force developed by press-fitting said last-mentioned gear on said one transmission shaft; and removing said first and second jig from said one transmission shaft.

2. The transmission gear assembling method according to claim 1, wherein said part of said first transmission shaft and said first jig are removably connected by means of screw threads formed thereon.

* * * * *